Aug. 17, 1965  S. L. KRAUSS  3,200,899
ELECTRONIC DYNAMIC SOUND LEVEL INDICATOR
Filed Oct. 5, 1959  2 Sheets-Sheet 1
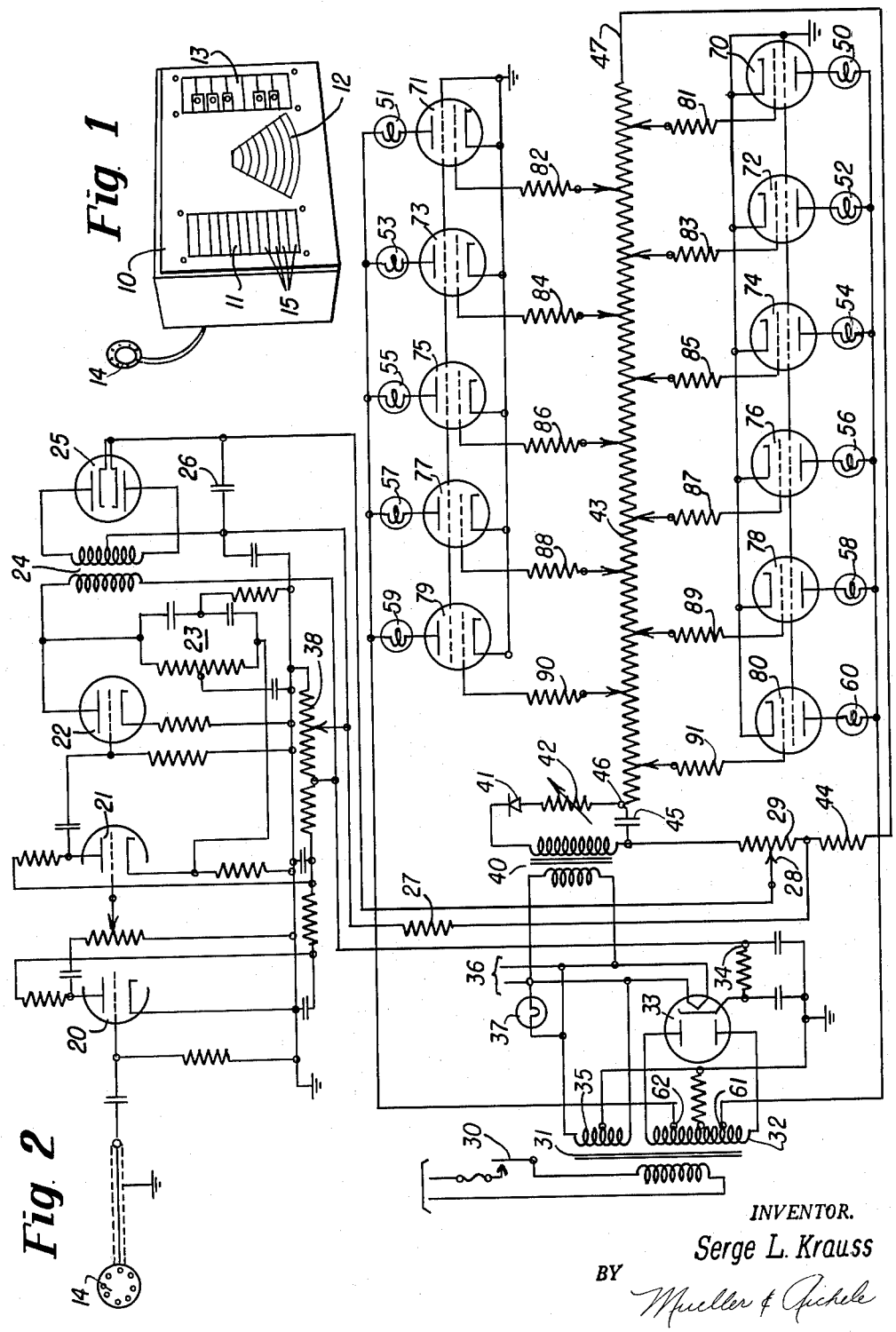
INVENTOR.
Serge L. Krauss
BY
Mueller & Aichele
Attys.

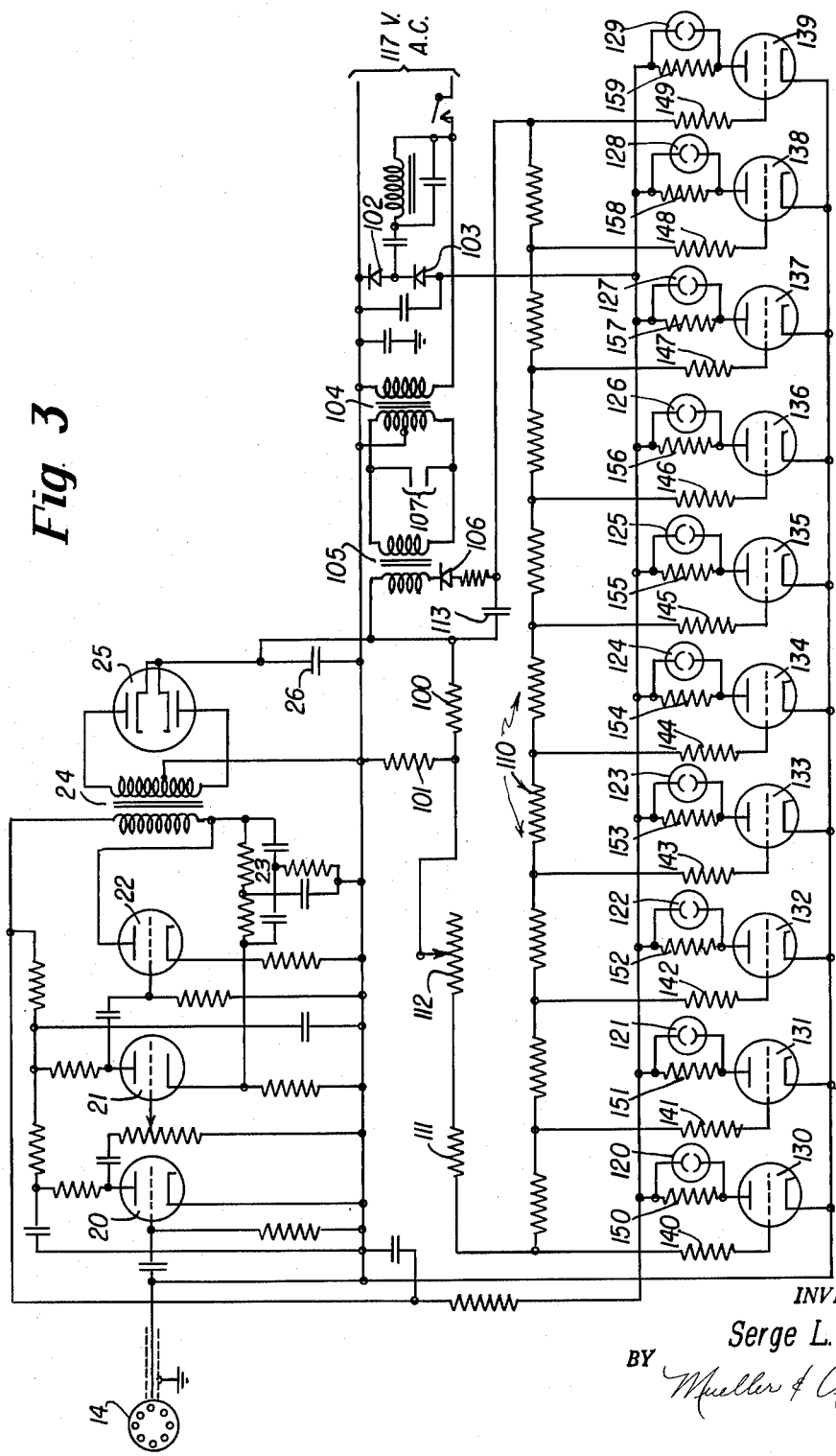

3,200,899
ELECTRONIC DYNAMIC SOUND LEVEL
INDICATOR
Serge L. Krauss, Elkhart, Ind., assignor to C. G. Conn,
Ltd., Elkhart, Ind., a corporation of Indiana
Filed Oct. 5, 1959, Ser. No. 844,404
3 Claims. (Cl. 181—.5)

This invention relates generally to sound level indicators and more particularly to a visual indicating system for directly showing the dynamic level of musical and other audible sounds.

In music and speech training and practice it is desired to have a visible and quick acting indication of the tone intensity of sounds produced. Although the human ear is generally used for this purpose, the human ear is not always sufficiently accurate and reliable. For example, it may be desired to play a musical scale or arpeggio at uniform loudness, and as the frequency of the notes changes the apparent loudness to the human ear may vary so that when the loudness appears to be uniform it is actually non-uniform.

It is also desired to provide an indicator which the musician himself can view and which will indicate the relative loudness of successive tones. It is not only desired to make a comparison with a fixed standard to provide uniform loudness, but it may be desired to view the relative loudness of successive tones as when a crescendo is played. It is important that such an indicator be of a size to be easily transported so that it can be used in various places. It may also be desired to combine the indicator with other instruments in a compact assembly. The indicator should also be of inexpensive construction so that it can be used by music schools, clinics, teachers, etc.

It is, therefore, an object of the present invention to provide an improved visible device for indicating the dynamic level of sound.

A further object is to provide a simple sound level indicator which shows on a lighted scale the relative level of sounds produced.

A feature of this invention is the provision of a dynamic level indicator with adjacent strips producing various colors when illuminated, and with the individual strips being illuminated by separate light sources in accordance with the dynamic level of sound applied thereto.

Another feature of the invention is the provision of a dynamic level indicating system including a plurality of control tubes individually controlling the energization of a plurality of lamps, with different static biases being applied to the individual control tubes and with a signal being applied thereto representing the sound to be indicated so that the lamps will be energized when the signal overcomes the static bias of the associated control tube. The system may include incandescent lamps controlled by thyratron tubes, or neon bulbs controlled by vacuum tubes.

The invention is illustrated in the accompanying drawing in which:

FIG. 1 shows the indicator in accordance with the invention combined with other indicators;

FIG. 2 is a circuit diagram of one embodiment of the invention; and

FIG. 3 is a circuit diagram of a second embodiment of the invention.

In practicing the invention there is provided a dynamic level indicator for sound including a microphone for picking up the sound and converting it to an electrical singal, an audio amplifier for increasing the level of the signal, and a rectifier for providing a control voltage representing the level of the sound. A plurality of lamps are provided arranged to illuminate strips of different colors positioned adjacent each other. A control tube is provided for each lamp to control the energization thereof. A bias circuit is provided to hold the control tubes cut off, with the bias applied to individual tubes differing in increments. The control voltage is applied to the tubes to overcome the cutoff bias so that the various lamps are illuminated as the sound level changes. The bias differences can be arranged so that adjacent strips will be illuminated when the sound level changes by a three or four decibel difference. Incandescent lamps can be used to illuminate the strips, with the operating voltage applied thereto through thyratron tubes which form the control tubes of the system. If lower intensity light is adequate, neon bulbs can be used, and these can be controlled by simple triode vacuum tubes. Eleven lights providing a range in intensity of forty decibels has been found to be satisfactory for most applications.

The dynamic sound level indicator of the invention is shown in FIG. 1 in an instrument which includes other facilities. This instrument 10 includes the dynamic sound level indicator 11. A large stroboscopic disk 12 is provided which indicates the exact frequency of a tone applied to the instrument. The representation of a keyboard is provided at 13, and this includes sections shaped like keys which are illuminated to indicate the particular note to which the stroboscopic disk 12 is adjusted. A frequency indicating device of this type is shown in Patent No. 2,286,030 issued June 9, 1942 to Young et al. A microphone 14 is connected to the instrument 10 to apply tones thereto which may be tones from an instrument, vocal sounds, or sound from any source.

The dynamic level indicator 11 includes a plurality of vertically arranged sections 15 which may be provided by colored windows or lenses. These are selectively illuminated by lamps provided behind the various sections to indicate the intensity of the tones applied. The lowest section is illuminated at a predetermined minimum tone level and the sections progressing therefrom are illuminated as the loudness increases. Accordingly the illumination in the bank of colored sections rises and falls as the tone intensity increases and decreases.

The circuit of the dynamic level control is shown in FIG. 2. Sounds are applied to the microphone 14 which converts these into electrical signals. The signals are amplified in the electronic amplifier including triode vacuum tubes 20, 21 and 22. A parallel T feedback circuit 23 is provided in the final amplifier stage 22 to accentuate the response at 4,000 cycles to make the indications more nearly agree with the response of the human ear. The audio output is applied to transformer 24 and is rectified in the full wave rectifier circuit including the double diode tube 25. The rectified output appears across capacitor 26 which is connected in parallel with resistor 27 and the portion of potentiometer 28 between the movable tap thereof and terminal 29. Potentiometer 28 is connected in a fixed bias circuit which will be described, and the contact thereon may be set to provide a potential to compensate for contact potential produced by the rectifier tube 25. The voltage across capacitor 26 follows the peaks of the signal regardless of polarity. The capacitor 26 has a value so that for peaks of very low duration the voltage will exist for sufficient time to produce an indication.

The dynamic level indicator is energized by a power supply connected through switch 30 to transformer 31. The transformer 31 has a winding 32 which feeds rectifier 33 to provide a direct current voltage at point 34. This is applied to the amplifier stages previously described as the operating voltage therefor. A winding 35 provides current for the heater of the rectifier 33 and for the heaters of the other tubes which connected at 36. A pilot light 37 is also energized from the winding 35.

The winding 35 of transformer 31 also supplies bias transformer 40 which has a secondary winding connected in a rectifier circuit. This includes diode 41, adjustable resistor 42, bleeder resistor 43, resistor 44 and potentiometer 29. Capacitor 45 is connected across bleeder resistor 43, resistor 44 and potentiometer 26 to remove any fluctuations from the voltage developed across these elements.

A plurality of incandescent lights 50 to 60 inclusive are provided which are selectively energized by thyratron tubes 70 and 80 inclusive. Each of these tubes has its cathode and screen grid grounded. The plates of the tubes are connected through incandescent lamps to taps 61 and 62 on the transformer winding 32. These taps provide the same voltage to all the tubes but the tubes are divided between the two taps so that current flows through the winding 32 in opposite directions and the tendency of the transformer 31 to saturate is thereby reduced. The grids of the tubes are connected through resistors 81 to 91 inclusive to the bleeder resistor 43.

The fixed bias rectifier circuit including rectifier 41 produces a voltage at point 46 which is negative with respect to the voltage at reference point 47 across the bleeder resistor 43. This will provide a greater negative bias to the thyratrons as the number increases. That is, the smallest negative bias will be applied to thyratron 70 and the largest to thyratron 80. An adjustable positive bias is derived from the movable contact of potentiometer 38 which is connected between point 34 and ground. This is combined through resistor 27 with a negative bias developed across resistor 44 of the fixed bias circuit, so that the potential at reference point 47 may be set to provide the desired bias point for the thyratron tubes 70 to 80 inclusive.

The control voltage produced from the signal by rectifier 25 will produce a voltage at the adjustable contact of potentiometer 28 which is positive with respect to ground. This will tend to overcome the negative bias produced by the static bias circuit so that the thyratron tubes will be selectively rendered conductive. It will be apparent that as a signal increases in amplitude the tube 70 will first conduct and then the tubes will conduct progressively until the tube 80 conducts. This will cause the lamps 50 to 60 inclusive to selectively conduct as the associated thyratron tubes conduct. The tubes may be arranged in a vertical sequence with the tube 50 being at the lower most position and the tube 60 at the upper most position of the various sections 15 shown in FIG. 1. Accordingly when sounds are applied to the microphone 14 the various sections 15 of the level indicator will be illuminated with the lower most sections being illuminated on low intensity sounds and the upper sections being illuminated as well as the lower sections, when the sound increases. As previously stated, the capacitor 26 coupled across the signal rectifier will hold the control voltage for a sufficient length of time to cause an indication which can be observed by the person using the instrument.

FIG. 3 shows a second embodiment of the dynamic level indicator circuit. The amplifier for the signals from the microphone 14 and the circuit including rectifier 25 for providing the control voltage may be identical to corresponding parts of FIG. 2. The rectified voltage is developed across capacitor 26, and resistors 100 and 101 are connected in series across this capacitor.

Operating voltage is provided from an alternating current source, with the operating voltages for the tubes being provided by a voltage doubler circuit including rectifiers 102 and 103. Transformer 104 provides hearther current at leads 107 and also feeds the bias transformer 105. The transformer 105 provides a static bias through action of rectifier 106, with the bias voltage being developed across bleeder resistor 110 which is connected in series with resistors 111, variable resistor 112 and resistor 100. The condenser 113 provides filtering action.

A plurality of neon bulbs 120 to 129 inclusive are provided which are selectively energized by triode tubes 130 to 139 respectively. These tubes are connected across the B+ source provided by rectifiers 102 and 103 and have grids connected through resistors 140 to 149 respectively to the bleeder resistor 110. The static bias across the bleeder resistor is arranged so that a small negative bias is applied to tube 130, and the negative bias increases with the maximum negative bias being applied across tube 139. The rectified voltage from the signal is of opposite polarity so that the static basis will be overcome and tube 130 will conduct on small signals to cause the neon bulb 120 to light up. As the signal level increases, the tubes to which a greater negative bias is applied will conduct to illuminate the neon bulbs energized thereby.

The indicator disclosed has been found to be highly satisfactory in indicating to a musician the loudness of tones produced. The indication makes it readily apparent when the loudness of tones increases or decreases so that the indication is in a form which is easily understood. The equipment required is relatively simple and the constructioin and adjustment thereof is not critical. The indicator can be combined with other equipment in an overall relatively small and compact unit so that the loudness can be observed at the same time the frequency or some other characteristic of the sound is observed.

I claim:

1. An indicator for visually showing the dynamic level of sound including in combination, translating means for converting sound waves to electrical waves, means for amplifying the electrical waves, said amplifying means including first and second stages each having input and output circuits, with said output circuit of said first stage coupled to said input circuit of said second stage, and feedback means coupling said output circuit of said second stage to said input circuit of said first stage including a parallel T feedback circuit for accentuating the response at frequencies of the order of 4,000 cycles per second to provide a response substantially the same as that of the human ear, full wave rectifier means for rectifying the amplified waves to produce a direct current control voltage, a plurality of strips of different colors positioned adjacent each other, a plurality of lamp means for individually illuminating said strips, a plurality of control means for individually controlling the energization of said lamp means, bias means for said control means including a bleeder resistor across which a static direct current voltage is developed, said resistor having taps connected to said control means for applying different direct current bias voltages thereto for holding the same inoperative, and means applying said direct control voltage from said rectifying means to said bleeder resistor with a polarity to oppose said static direct current voltage, with the control voltage selectively overcoming the bias voltages applied to said control means in accordance with the amplitude of the sound waves and thereby selectively energizing said lamp means to illuminate said strips.

2. An indicator for visually showing the dynamic level of sound including in combination, translating means for converting sound waves to electrical waves, means for amplifying the electrical waves, said amplifying means including first and second stages each having input and output circuits, with said output circuit of said first stage coupled to said input circuit of said second stage, and feedback means coupling said output circuit of said second stage to said input circuit of said first stage including a parallel T feedback circuit for accentuating the response at frequencies of order of 4000 cycles to provide a response substantially the same as that of the human ear, full wave rectifier means for rectifying the amplified waves to produce a direct current control voltage, a plurality of window sections positioned adjacent each other, a plurality of incandescent lamps for individually illuminating said sections, a plurality of thyratron tubes for individually controlling the energization of said lamps, said tubes having grids for controlling the conductivity thereof, bias means for said tubes including a bleeder resistor across which a static direct current voltage is developed, said resistor having taps connected to said grids of said tubes for applying thereto negative direct current bias voltages of different values for holding said tubes nonconductive, and means applying said direct current control voltage from said rectifying means to said bleeder resistor with a polarity to oppose said static direct current voltage, with the control voltage selectively overcoming said negative bias voltages to apply positive potentials to said grids in accordance with the amplitude of the sound waves, and thereby selectively rendering said tubes conductive to energize said lamps and illuminate said sections.

3. An indicator for visually showing the dynamic level of sound including in combination, translating means for converting sound waves to electrical waves, means for amplifying the electrical waves, said amplifying means including first and second stages each having input and output circuits, with said output circuit of said first stage coupled to said input circuit of said second stage, and feedback means coupling said output circuit of said second stage to said input circuit of said first stage including a parallel T feedback circuit for accelerating the response at frequencies of the order of 4000 cycles to provide a response substantially the same as that of the human ear, full wave rectifier means for rectifying the amplified waves to produce a direct current control voltage, a plurality of window sections positioned adjacent each other, a plurality of neon bulbs for individually illuminating said sections, a plurality of control devices for individually controlling the energization of said bulbs, said control devices having a control electrode which controls the conductivity of the device in accordance with the bias voltage applied thereto, bias means for said control devices including a bleeder resistor across which a static direct current voltage is developed, said resistor having taps individually connected to said electrodes of said control devices for applying different negative direct current bias voltages thereto for holding the same inoperative, and means applying said direct current control voltage from said rectifying means to said bleeder resistor with a polarity to oppose said static direct current voltage, with the control voltage selectively overcoming the bias voltages to apply positive potentials to said electrodes of said devices in accordance with the amplitude of the sound waves, and thereby selectively rendering said devices conductive to energize said bulbs and to illuminate said sections.

References Cited by the Examiner

UNITED STATES PATENTS

| | | | |
|---|---|---|---|
| 2,179,101 | 11/39 | Read | 315—201 |
| 2,275,283 | 3/42 | Burchfied | 84—464 |
| 2,486,890 | 11/49 | Stanmyre | 179—1.7 |
| 2,494,643 | 1/50 | Clark. | |
| 2,495,511 | 1/50 | Dolberg | 330—109 |
| 2,884,085 | 4/59 | Von Wittern et al. | 181—0.52 |
| 3,029,317 | 4/62 | Davidson | 330—109 X |

SAMUEL FEINBERG, *Primary Examiner.*

CHESTER L. JUSTIS, *Examiner.*